(12) United States Patent
Lu et al.

(10) Patent No.: US 8,478,091 B2
(45) Date of Patent: Jul. 2, 2013

(54) SINGLE-STAGE 1×5 GRATING-ASSISTED WAVELENGTH DIVISION MULTIPLEXER (75) Inventors: Hung-Chih Lu, Taoyuan County (TW); Jen-Inn Chyi, Taoyuan County (TW)

(73) Assignee: National Central University, Jhongli (TW)

( * ) Notice: Subject to any disclaimer, the term of this patent is extended or adjusted under 35 U.S.C. 154(b) by 255 days.

(21) Appl. No.: 13/106,072

(22) Filed: May 12, 2011

(65) Prior Publication Data
US 2012/0189249 A1 Jul. 26, 2012

(30) Foreign Application Priority Data

Jan. 20, 2011 (TW) .................................. 100102084

(51) Int. Cl.
*G02B 6/34* (2006.01)
(52) U.S. Cl.
USPC ............... 385/37; 385/15; 385/27; 385/39; 385/47; 385/48

(58) Field of Classification Search
None
See application file for complete search history.

(56) References Cited

U.S. PATENT DOCUMENTS

2003/0048989 A1* 3/2003 Kashihara et al. .............. 385/37

* cited by examiner

*Primary Examiner* — Uyen Chau N Le
*Assistant Examiner* — Chad Smith
(74) *Attorney, Agent, or Firm* — Jackson IPG PLLC (57) ABSTRACT

A single-stage 1×5 grating-assisted wavelength division multiplexer is provided. A grating-assisted asymmetric Mach-Zehnder interferometer, a plurality of grating-assisted cross-state directional couplers and a plurality of novel side-band eliminators are combined to form the multiplexer. Only general gratings are required, not Bragg grating, for 5-channel wavelength division multiplexing in a single stage. A nearly ideal square-like band-pass filtering passband is obtained. The present disclosure can be used as a core device in IC-to-IC optical interconnects for multiplexing and demultiplexing of an optical transceiver. The present disclosure has a small size and good performance.

3 Claims, 11 Drawing Sheets

SINGLE-STAGE 1×5 GRATING-ASSISTED WAVELENGTH DIVISION MULTIPLEXER

TECHNICAL FIELD OF THE DISCLOSURE

The present disclosure relates to a wavelength division multiplexer; more particularly, related to a wavelength division multiplexer for multiplexing and demultiplexing of a single-chip optical transceiver, where only general gratings are used for 5-channel wavelength division multiplexing in a single stage with a nearly ideal square band-pass filtering passband; and where the wavelength division multiplexer has a small size.

DESCRIPTION OF THE RELATED ARTS

On a single chip of silicon-on-insulator (SOI) wafer, circuits are integrated and fabricated for optical interconnection. The core device for IC-to-IC optical interconnection is an optical transceiver. However, the core component of the optical transceiver is a wavelength division multiplexer. The wavelength division multiplexer can be a structure of arrayed waveguide gratings, cascaded Mach-Zehnder interferometers, or cascaded ring resonators.

Therein, the size of the arrayed waveguide gratings is too big to be used in IC-to-IC optical interconnection. It is because that the chip for monolithic optical interconnection must be integrated with electrical circuits, which include central processing unit (CPU), random access memory (RAM), video chip, etc., and optical devices, which include wavelength division multiplexer, optical modulator, photodetector, etc. Therefore, the size of the arrayed waveguide gratings becomes critical for reducing the size of an optical device. Inside the chip, abilities of multiplexing and demultiplexing must be included. If the arrayed waveguide gratings are used, the size of the chip will be too big to be fabricated on the chip.

The cascaded Mach-Zehnder interferometers are expensive and have low yields. Although the cascaded Mach-Zehnder interferometers have smaller size than the arrayed waveguide gratings in lower channels, their lengths are centimeters long only and are harder to be fabricated for IC-to-IC optical interconnection. Although they can be fabricated into 1×2 wavelength division multiplexers, they have to be cascaded to form $1 \times 2^N$, where N is the number of stage. However, by doing so, the size of the cascaded wavelength division multiplexers will become so big and produce a great loading on the lithography process of SOI wafer for optical interconnection. Nevertheless, high-precise lithography process becomes required for this type of wavelength division multiplexers. The cost is increased and yield is decreased at the same time.

The cascaded ring resonators can be used in submicron waveguide only but with big coupling loss and high assembly cost. The cascaded ring resonators have very small 3 dB bandwidth (about 0.1 Å), so the light sources require high accuracy wavelengths. Moreover, this type of waveguides needs big-angle curves, so that they are fit for submicron waveguides below 0.55 μm only. Yet, such small waveguides will cause big coupling loss between optical fibers and chips. Besides, those laser sources must have high power and high wavelength-accuracy, which also increases the cost.

For 4-channel outputs, cascade formed by many 1×2 or 1×3 single-stage structures is required. But, the above prior arts of single-stage wavelength division multiplexers for optical interconnection have very big sizes, not to mention that the cascade makes its size bigger and not applicable for IC-to-IC optical interconnection.

Only grating-assisted wavelength division multiplexers can greatly reduce the sizes while maintaining performance. They are grating-assisted directional couplers and grating-assisted Mach-Zehnder interferometers. The gratings they use are all Bragg gratings. However, they are used in optical communication but not IC-to-IC optical interconnection. It is because that the Bragg gratings must be used for obtaining ideal passband. But, it is difficult to fabricate Bragg gratings on the SOI chip. Thus, most of them are used in silica and polymer waveguides. If conventional gratings are used on the SOI chip, only −5 dB crosstalk is obtained. The crosstalk must have at least −18 dB to obtain enough signal noise ratio.

In short, for wavelength division multiplexers used in IC-to-IC optical interconnection, the sizes of arrayed waveguide gratings or those of the cascaded Mach-Zehnder interferometers are too big; and, the cascaded ring resonators require high-power and high-wavelength accuracy laser sources. In addition, if grating-assisted wavelength division multiplexers are used, Bragg gratings have to be used and they are very difficult to be fabricated on the SOI chip. Hence, the prior arts do not fulfill all users' requests on actual use.

SUMMARY OF THE DISCLOSURE

The main purpose of the present disclosure is to provide a single-stage 1×5 grating-assisted wavelength division multiplexer as a core device for IC-to-IC optical interconnection with a small size, a simple fabrication process and good performance.

The second purpose of the present disclosure is to provide a wavelength division multiplexer for multiplexing and demultiplexing of a single-chip optical transceiver in the IC-to-IC optical interconnection.

The third purpose of the present disclosure is to use general gratings to process 5-channel wavelength division multiplexing in a single stage for obtaining an ideal square-like band-pass filtering passband and thus to obtain a small size.

To achieve the above purposes, the present disclosure is a single-stage 1×5 grating-assisted wavelength division multiplexer, comprising a grating-assisted asymmetric Mach-Zehnder interferometer, a first grating-assisted cross-state directional coupler, a second grating-assisted cross-state directional coupler, a first side-band eliminator, a second side-band eliminator, a third side-band eliminator, and a fourth side-band eliminator, where the grating-assisted asymmetric Mach-Zehnder interferometer comprises a first 3 dB directional coupler, an asymmetric phase-shifting waveguide region, a first grating and a second 3 dB directional coupler; the first grating-assisted cross-state directional coupler comprises a sixth output waveguide, a fourth output waveguide, a second grating and a second output waveguide; the second grating-assisted cross-state directional coupler comprises a seventh output waveguide, a fifth output waveguide, a third grating and a third output waveguide; the first side-band eliminator comprises a first output waveguide, a connecting waveguide and a fourth grating; the second side-band eliminator comprises a connecting waveguide, an eighth output waveguide and a fifth grating; the third side-band eliminator comprises a second output waveguide, a ninth output waveguide and a sixth grating; the fourth side-band eliminator comprises a third output waveguide, a tenth output waveguide and a seventh grating; the first 3 dB directional coupler is connected with an end of a first input waveguide to receive a light from the first input waveguide to divide the light into two lights having even powers; an end of the asymmetric phase-shifting waveguide region is connected with the first 3 dB directional coupler; the asymmetric phase-shifting waveguide region comprises a first phase-shifting waveguide and a second phase-shifting waveguide; a parallel area of the asymmetric phase-shifting waveguide region is obtained by a part of the first phase-shifting waveguide and a part of the second phase-shifting waveguide and the part of the first phase-shifting waveguide and the part of the second phase-shifting waveguide are parallel with a fixed interval maintained; a phase difference is obtained from the parallel area after the two lights having even powers are passed through the first phase-shifting waveguide and the second phase-shifting waveguide separately; the first grating is obtained on the parallel area of the first phase-shifting waveguide and the second phase-shifting waveguide; the second 3 dB directional coupler is connected with another end of the asymmetric phase-shifting waveguide region to receive the two lights having the phase difference from the asymmetric phase-shifting waveguide region; the two lights having the phase difference are interfered with each other to process wavelength division multiplexing to be coupled to the first output waveguide, a sixth output waveguide and a seventh output waveguide by different wavelengths; the first grating-assisted cross-state directional coupler is connected with an end of the grating-assisted asymmetric Mach-Zehnder interferometer through the sixth output waveguide; an end of the sixth output waveguide is connected with the first phase-shifting waveguide; a part of an end of the fourth output waveguide is parallel to a part of another end of the sixth output waveguide with a fixed interval maintained; the second grating is obtained on the fourth output waveguide and the sixth output waveguide; an end of the second output waveguide is connected with an end of the fourth output waveguide; the second grating-assisted cross-state directional coupler is connected with another end of the grating-assisted asymmetric Mach-Zehnder interferometer through the seventh output waveguide, an end of the seventh output waveguide is connected with an end of second phase-shifting waveguide; a part of an end of the fifth output waveguide is parallel to a part of another end of the seventh output waveguide with a fixed interval maintained; the third grating is obtained on the fifth output waveguide and the seventh output waveguide; an end of the third output waveguide is connected with an end of the fifth output waveguide; an end of the first side-band eliminator is connected with another end of the grating-assisted asymmetric Mach-Zehnder interferometer through the first output waveguide; an end of the first output waveguide is connected with another end of the first phase-shifting waveguide; a part of an end of the connecting waveguide is parallel to a part of another end of the first output waveguide with a fixed interval maintained; the fourth grating is obtained on the first output waveguide and the connecting waveguide; an end of the second side-band eliminator is connected with another end of the first side-band eliminator through the connecting waveguide; a part of an end of the eighth output waveguide is parallel to a part of another end of the connecting waveguide with a fixed interval maintained; the fifth grating is obtained on the eighth output waveguide and the connecting waveguide; an end of the third side-band eliminator is connected with another end of the first grating-assisted cross-state directional coupler through the second output waveguide; a part of an end of the ninth output waveguide is parallel to a part of another end of the second output waveguide with a fixed interval maintained; the sixth grating is obtained on the second output waveguide and the ninth output waveguide; an end of the fourth side-band eliminator is connected with another end of the second grating-assisted cross-state directional coupler through the third output waveguide; a part of an end of the tenth output waveguide is parallel to a part of another end of the third output waveguide with a fixed interval maintained; and the seventh grating is obtained on the third output waveguide and the tenth output waveguide. Accordingly, a novel single-stage 1×5 grating-assisted wavelength division multiplexer is obtained.

BRIEF DESCRIPTIONS OF THE DRAWINGS

The present disclosure will be better understood from the following detailed description of the preferred embodiment according to the present disclosure, taken in conjunction with the accompanying drawings, in which.

DESCRIPTION OF THE PREFERRED EMBODIMENT

The following description of the preferred embodiment is provided to understand the features and the structures of the present disclosure.

Please refer to FIG. 1 to FIG. 4, which are a structural view showing a preferred embodiment according to the present disclosure; a spectral view showing a transmission of 1550 nm wavelength band; a structural view showing a grating; and a view showing spectrum of the grating. As shown in the figures, the present disclosure is a single-stage 1×5 grating-assisted wavelength division multiplexer, comprising a grating-assisted asymmetric Mach-Zehnder interferometer 100, a plurality of grating-assisted cross-state directional couplers 206,208, a plurality of gratings 301,303,305 and a plurality of side-band eliminators 220,222,224,226.

Figure 1:
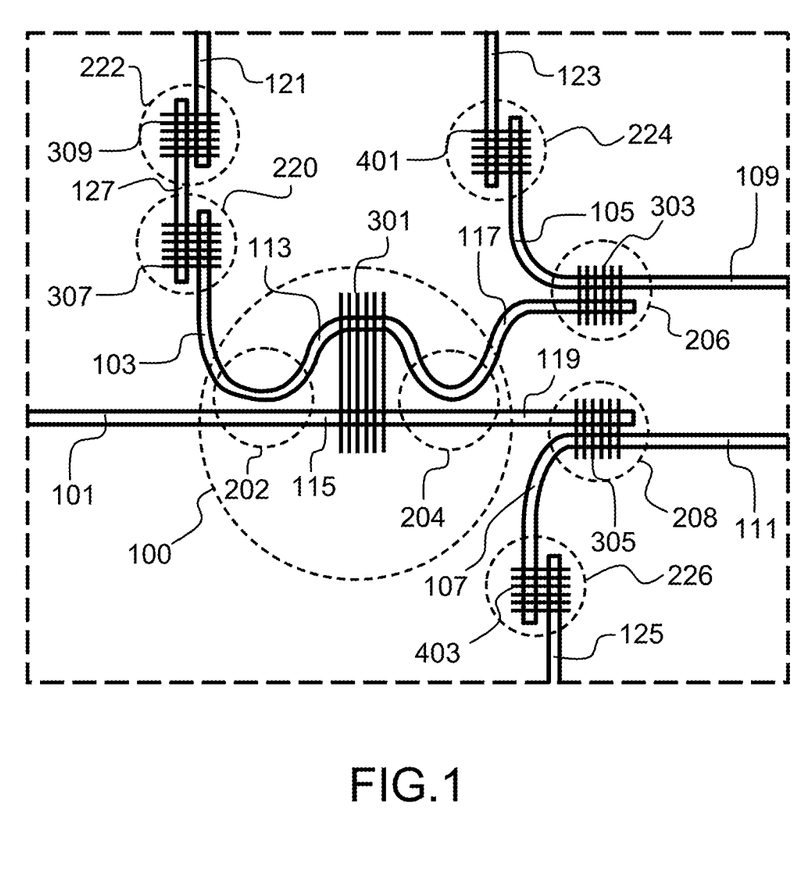
FIG. 1 is the structural view showing the preferred embodiment according to the present disclosure.

The grating-assisted asymmetric Mach-Zehnder interferometer 100 comprises a first 3 dB directional coupler 202, an asymmetric phase-shifting waveguide region, a first grating 301 and a second 3 dB directional coupler 204. The first 3 dB directional coupler 202 is connected with an end of a first input waveguide 101 to receive a light from the first input waveguide 101 for dividing the light into two lights having even powers. An end of the asymmetric phase-shifting waveguide region is connected with the first 3 dB directional coupler 202. The asymmetric phase-shifting waveguide region has a first phase-shifting waveguide 113 and a second phase-shifting waveguide 115. The second phase-shifting waveguide 115 has a length shorter than the first phase-shifting waveguide 113. A parallel area of the asymmetric phase-shifting waveguide region is formed by a part of the first phase-shifting waveguide 113 and a part of the second phase-shifting waveguide 115; and, the part of the first phase-shifting waveguide 113 is parallel to the part of the second phase-shifting waveguide 115 with a fixed interval maintained so that a phase difference is formed from the parallel area of the asymmetric phase-shifting waveguide region after the two lights having even powers are passed through the first phase-shifting waveguide 113 and the second phase-shifting waveguide 115 separately. The first grating 301 is deposed on the parallel area of asymmetric phase-shifting waveguide region having the first and the second phase-shifting waveguides 113,115. The second 3 dB directional coupler 204 is a 2×2 3 dB directional coupler and is connected with another end of the asymmetric phase-shifting waveguide region (i.e. the first and the second phase-shifting waveguides 113,115) to receive the two lights having the phase difference obtained from the first and the second phase-shifting waveguides 113,115. The two lights having the phase difference are interfered with each other to process wavelength division multiplexing to be coupled into different wavelength outputs, a first output waveguide 103, a sixth output waveguide 117 and a seventh output waveguide 119, by different wavelengths separately.

The first grating-assisted cross-state directional coupler 206 is connected with an end of the grating-assisted asymmetric Mach-Zehnder interferometer 100 through the sixth output waveguide 117. The first grating-assisted cross-state directional coupler comprises the sixth output waveguide 117, a fourth output waveguide 109, a second grating 303 and a second output waveguide 105. An end of the sixth output waveguide 117 is connected with the first phase-shifting waveguide 113. The other end of the sixth output waveguide 117 is cut off. A part of an end of the fourth output waveguide 109 is parallel to a part of another end of the sixth output waveguide 117 with a fixed interval maintained. The second grating 303 is deposed on the fourth and the sixth output waveguides 109,117. An end of the second output waveguide 105 is connected with an end of the fourth output waveguide 109.

The second grating-assisted cross-state directional coupler 208 is connected with another end of the grating-assisted asymmetric Mach-Zehnder interferometer 100 through the seventh output waveguide 119. The second grating-assisted cross-state directional coupler comprises the seventh output waveguide 119, a fifth output waveguide 111, a third grating 305 and a third output waveguide 107. An end of the seventh output waveguide 119 is connected with an end of second phase-shifting waveguide 115. The other end of the seventh output waveguide 119 is cut off. A part of an end of the fifth output waveguide 111 is parallel to a part of another end of the seventh output waveguide 119 with a fixed interval maintained. The third grating 305 is deposed on the fifth and the seventh output waveguide 111,119. An end of the third output waveguide 107 is connected with an end of the fifth output waveguide 111.

An end of the first side-band eliminator 220 is connected with another end of the grating-assisted asymmetric Mach-Zehnder interferometer 100 through the first output waveguide 103. The first side-band eliminator 220 comprises the first output waveguide 103, a connecting waveguide 127 and a fourth grating 307. An end of the first output waveguide 103 is connected with another end of the first phase-shifting waveguide 113. The other end of the first output waveguide 103 is cut off. The connecting waveguide 127 is cut-off at both ends. A part of an end of the connecting waveguide 127 is parallel to a part of another end of the first output waveguide 103 with a fixed interval maintained. The fourth grating 307 is deposed on the first output waveguide 103 and the connecting waveguide 127.

An end of the second side-band eliminator 222 is connected with another end of the first side-band eliminator 220 through the connecting waveguide 127. The second side-band eliminator 222 comprises the connecting waveguide 127, an eighth output waveguide 121 and a fifth grating 309. A part of an end of the eighth output waveguide 121 is parallel to a part of another end of the connecting waveguide 127 with a fixed interval maintained. The other end of the eighth output waveguide 121 is cut off. The fifth grating 309 is deposed on the eighth output waveguide 121 and the connecting waveguide 127.

An end of the third side-band eliminator 224 is connected with another end of the first grating-assisted cross-state directional coupler 206 through the second output waveguide 105. The third side-band eliminator 224 comprises the second output waveguide 105, a ninth output waveguide 123 and a sixth grating 401. A part of an end of the ninth output waveguide 123 is parallel to a part of another end of the second output waveguide 105 with a fixed interval maintained. The other end of the second and the ninth output waveguides 105,123 is cut off. The sixth grating 401 is deposed on the second and the ninth output waveguides 105, 123.

An end of the fourth side-band eliminator 226 is connected with another end of the second grating-assisted cross-state directional coupler 208 through the third output waveguide 107. The fourth side-band eliminator 226 comprises the third output waveguide 107, a tenth output waveguide 125 and a seventh grating 403. A part of an end of the tenth output waveguide 125 is parallel to a part of another end of the third output waveguide 107 with a fixed interval maintained. The other end of third and tenth output waveguide 107, 125 is cut off. The seventh grating 403 is deposed on the third and the tenth output waveguides 107,125.

The first grating 301 is designed for a specific wavelength for reflecting a light having the specific wavelength to be coupled to another waveguide at an input end of the first 3 dB directional coupler 202 for forming another output end (i.e. the first output waveguide 103). Thus, wavelength division multiplexing is done to the light having the specific wavelength.

The second and the third gratings 303,305 are designed for specific wavelengths for reflecting lights having the specific wavelengths to be coupled to another waveguides of an input end for forming another output end (i.e. the second and the third output waveguide 105,107). Thus, wavelength division multiplexing is done to the lights having the specific wavelengths.

The grating-assisted cross-state directional couplers 206, 208 comprise two nearby waveguides for each (i.e. 117,109 and 119,111), which are connected with two outputs of the grating-assisted asymmetric Mach-Zehnder interferometer 100. Light is transmitted to the couplers through an input waveguide, so that the light is slowly coupled to another waveguide. After the light is completely coupled to the waveguide, it is slowly coupled back. Thus, a periodical optical coupling is formed, where a cross state is obtained when light is completely transferred to another waveguide and a 3 dB directional coupling is obtained when only a half of the light is transferred.

The side-band eliminators 220,222,224,226 are especially designed according to the present disclosure, which are based on grating-assisted directional couplers. But, therein, an input waveguide in cross state and a corresponding output waveguide are cut to form only one input end and one output end. When side bands pass through the side-band eliminators 220,222,224,226, the side band is scattered from the truncated waveguide with the main band left only. Thus, a nearly ideal passband is obtained just like by using a Bragg grating.

Owing to that a grating will reflect a specific wavelength, the first grating 301 is fabricated on the second phase-shifting waveguide 115, which is shorter than the first phase-shifting waveguide 113, and the first phase-shifting waveguide 113 for reflecting a specific wavelength. Thus, an extra output end is obtained (i.e. the first output waveguide 103). The above method used for increasing an extra output end by using a grating to reflect a specific wavelength are also applied on the sixth output waveguide 117 and the seventh output waveguide 119 to increase output ends from two output ends, which are the sixth and the seventh output waveguides 117,119, to four output ends, which are the second, the third, the fourth and the fifth output waveguides 105,107,109,111, respectively. Thus, the present disclosure obtains five output ends without serial connection.

Yet, if general gratings are used on the grating-assisted asymmetric Mach-Zehnder interferometer 100, and the grating-assisted cross-state directional couplers 206,208, side bands will happen and crosstalk will be seriously affected. For solving the problem, the present disclosure uses novel side-band eliminators 220,222,224,226 having general gratings to obtain a grating-assisted wavelength division multiplexer having a small size and nearly ideal passband at the same time, not trade-off.

Hence, wavelength division in the present disclosure combines the following mechanisms: wavelength division multiplexing through two output ends of the grating-assisted asymmetric Mach-Zehnder interferometer 100; optical power coupling through the grating-assisted cross-state directional couplers 206,208; reflection of lights having specific wavelengths through the gratings 301,303,305; and the uniquely designed side-band eliminators 220,222,224,226. Thus, side bands that seriously affect crosstalk are eliminated for obtaining a nearly ideal passband. In this way, the present disclosure processes a 1×5 wavelength division multiplexing in a single stage by using general gratings only. Because the present disclosure has small size, easy fabrication, and good spectral response at the same time, it is especially fit for IC-to-IC optical interconnection.

In optical communications, wavelength bands of lasers for 1310 nanometers (nm), 1490 nm and 1550 nm are used. Yet, in IC-to-IC optical interconnection, only 1550 nm wavelength is suitable to be used for low propagation loss, which is also an example in the present disclosure.

Figure 2:
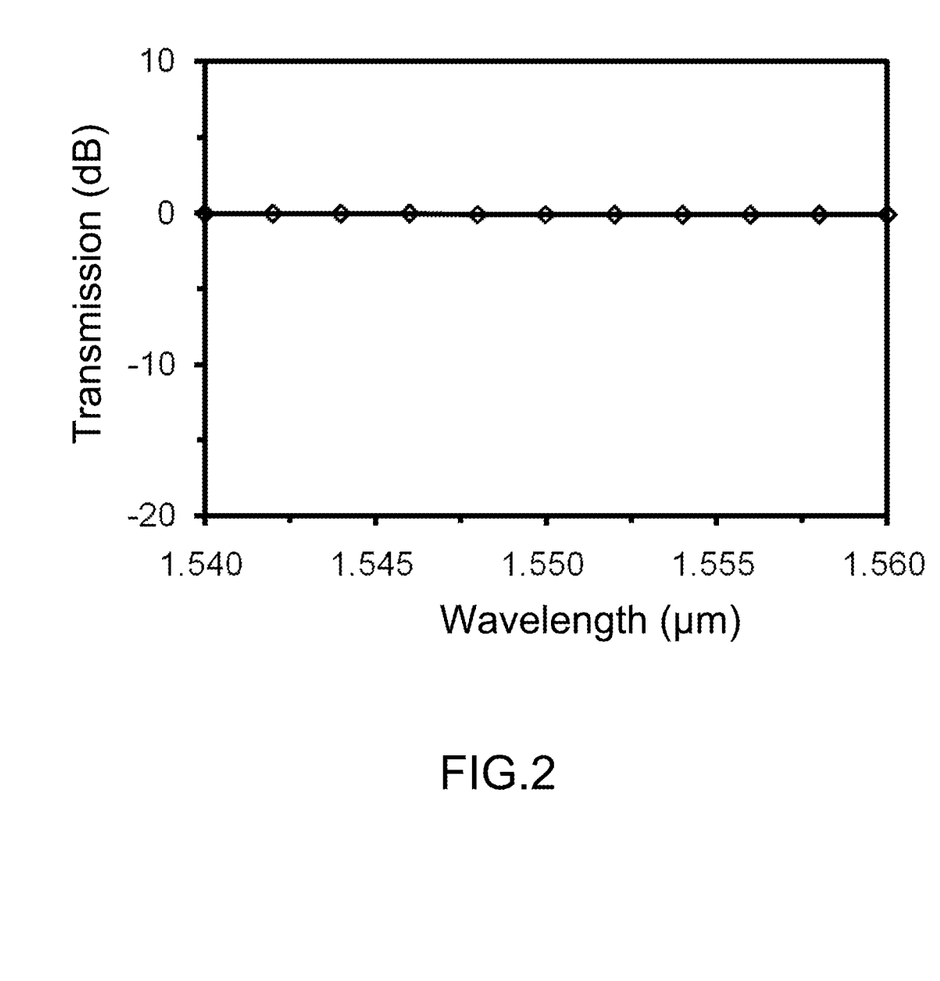
FIG. 2 is the spectral view showing the transmission of 1550 nm wavelength band.

In FIG. 2, after singles with 1550 nm wavelength passes through a waveguide, a flat response is shown, which means no obvious power loss.

In order to describe the mechanism of asymmetric grating-assisted Mach-Zehnder interferometer, mechanisms of grating and asymmetric Mach-Zehnder interferometer are individually described.

Figure 3:
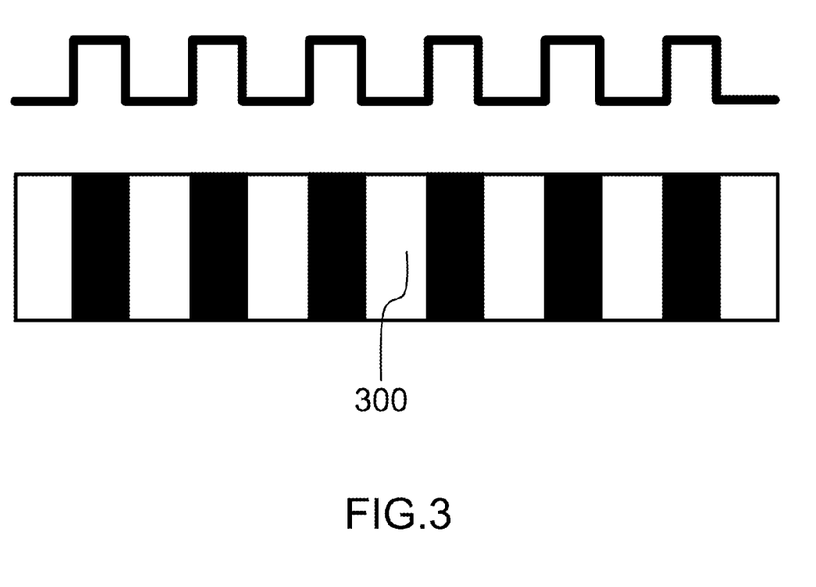
FIG. 3 is the structural view showing the grating.
Figure 4:
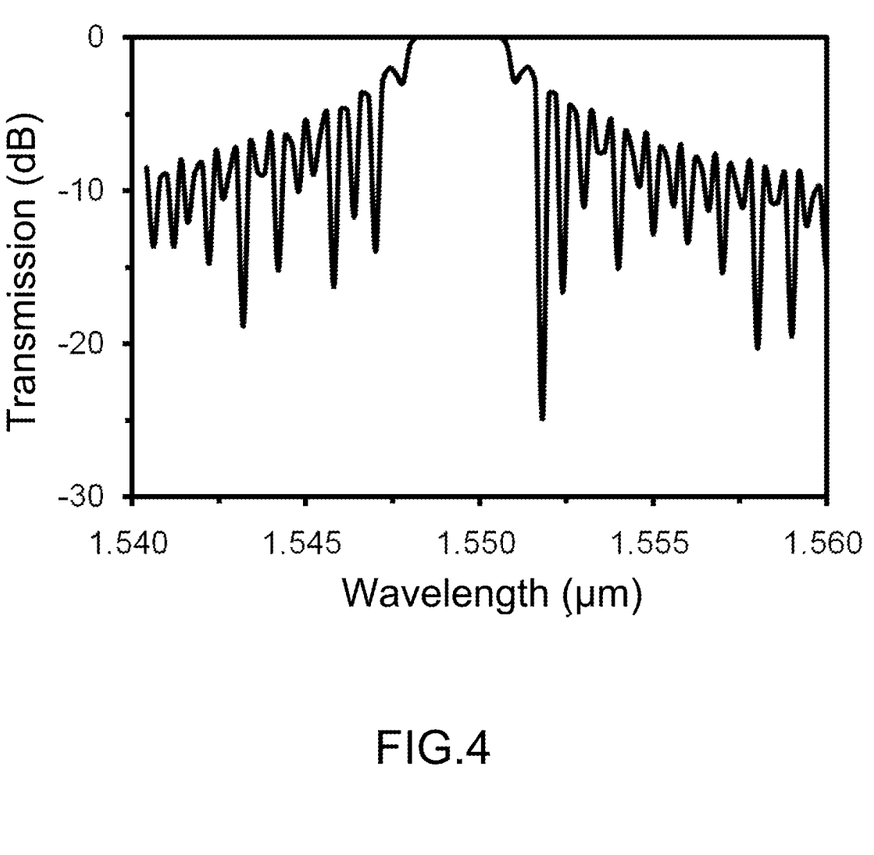
FIG. 4 is the view showing the spectrum of the grating.

FIG. 3 and FIG. 4 show the structure and the spectral response of gratings, respectively.

In the asymmetric Mach-Zehnder interferometer, after 1500 nm wavelength passes through the eighth grating 300, a band of wavelength is reflected to obtain a band-pass filtering spectral response. In FIG. 4, the eighth grating 300 is a general grating, which may have a bad spectral response and produce −5 dB crosstalk at a side channel. Yet, in a general optical communication, −18 dB crosstalk is required and so the eighth grating 300 is usually not applicable, where Bragg grating is applicable though not affordable in a silicon-on-insulator chip. Hence, it is an obvious improvement for the present disclosure to use a general grating to function just like a Bragg grating.

Figure 5:
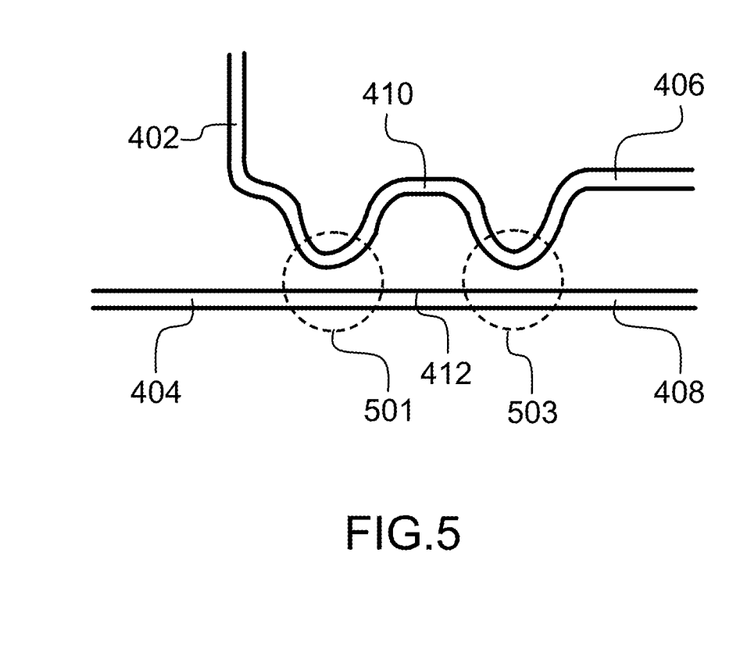
FIG. 5 is the structural view showing the asymmetric Mach-Zehnder interferometer.
Figure 6:
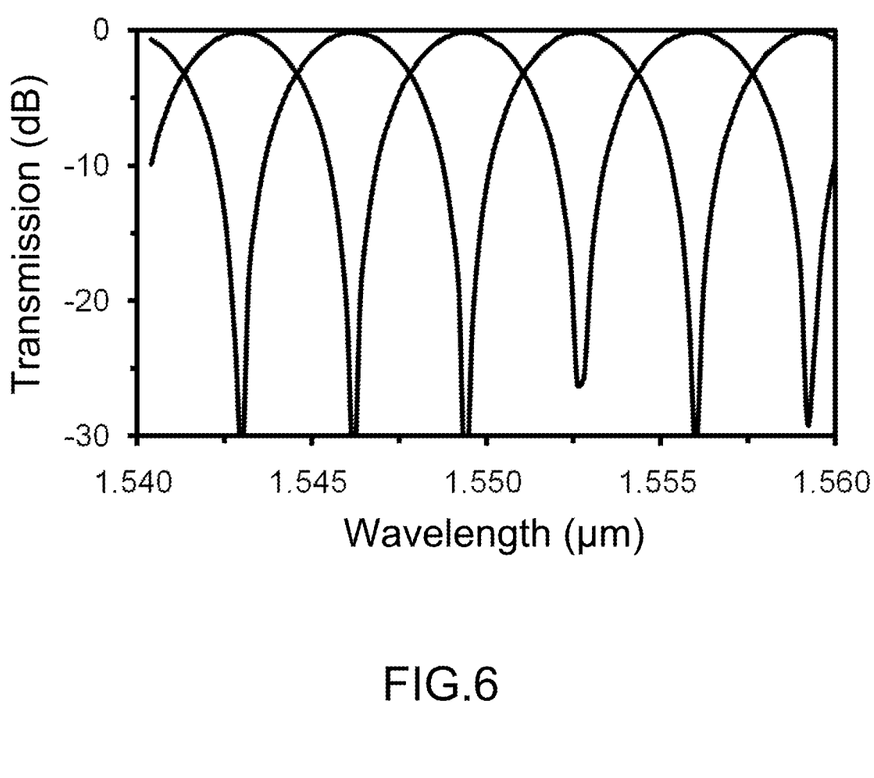
FIG. 6 is the view showing the spectrum of the asymmetric Mach-Zehnder interferometer.

Please further refer to FIG. 5 and FIG. 6, which are a structural view showing the asymmetric Mach-Zehnder interferometer; and a view showing its spectrum. As shown in the figures, the asymmetric Mach-Zehnder interferometer has two input ends, the second input waveguide 402 and the third input waveguide 404. When lights having different wavelengths enter from input ends, they are coupled through the third 3 dB directional coupler 501 to be divided evenly to the third phase-shifting waveguide 410 and the fourth phase-shifting waveguide 412. Because the two waveguides have different lengths, a phase difference happens. After passing through the fourth 3 dB directional coupler 503, the divided lights are separately coupled to two ends, the eleventh output waveguide 406 and the twelfth output waveguide 408. Thus, in FIG. 6, lights having different wavelengths are divided, where the spectral bands are periodical owing to the only two output ends (i.e. the eleventh output waveguide 406 and the twelfth output waveguide 408).

As is referred in FIG. 1, the present disclosure comprises a grating-assisted asymmetric Mach-Zehnder interferometer 100, a plurality of grating-assisted cross-state directional couplers 206,208, a plurality of gratings 301,303,305, and a plurality of novel side-band eliminators 220,222,224,226. After lights having different wavelengths pass through the grating-assisted asymmetric Mach-Zehnder interferometer 100, the spectral bands obtains a Gaussian-like distribution and a periodical characteristic. As the first grating 301 is deposed on the first phase-shifting waveguide 113 and the second phase-shifting waveguide 115, a light having a specific wavelength will be reflected to be reversely coupled to another input end. Thus, an extra output end, the first output waveguide 103, is obtained to form band-pass filtering with an extra output channel.

Figure 7:
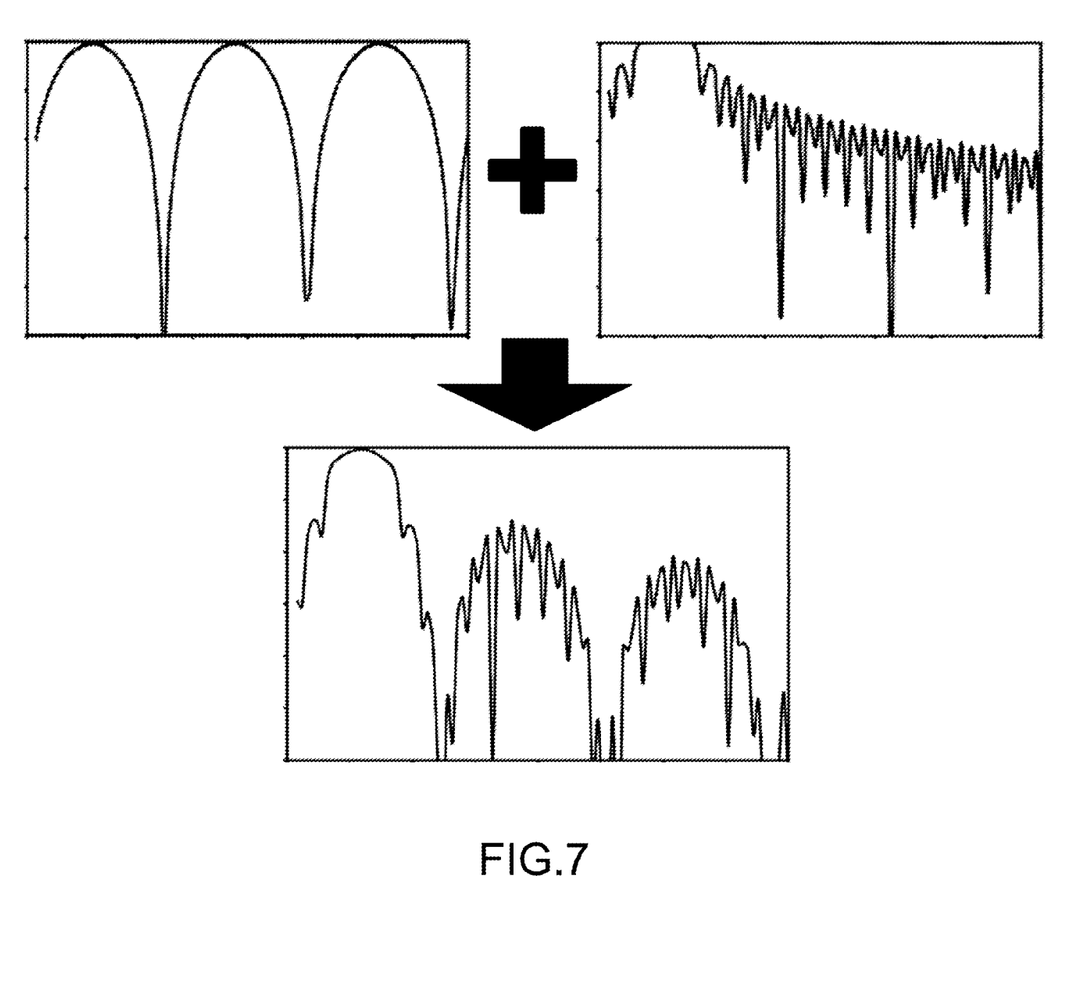
FIG. 7 is the view showing the spectral interaction between the asymmetric Mach-Zehnder interferometer and the grating.

Please further refer to FIG. 7, which is a view showing a spectral interaction between an asymmetric Mach-Zehnder interferometer and a grating. As shown in the figure, a general grating has a bad spectral response and about −5 dB crosstalk and can not be directly used alone. But, after an asymmetric Mach-Zehnder interferometer is combined with a general grating 301 to form the grating-assisted asymmetric Mach-Zehnder interferometer 100, a spectral band is enhanced to form a nearly ideal main passband, though accompanied with a side-band which produces crosstalk.

Figure 8:
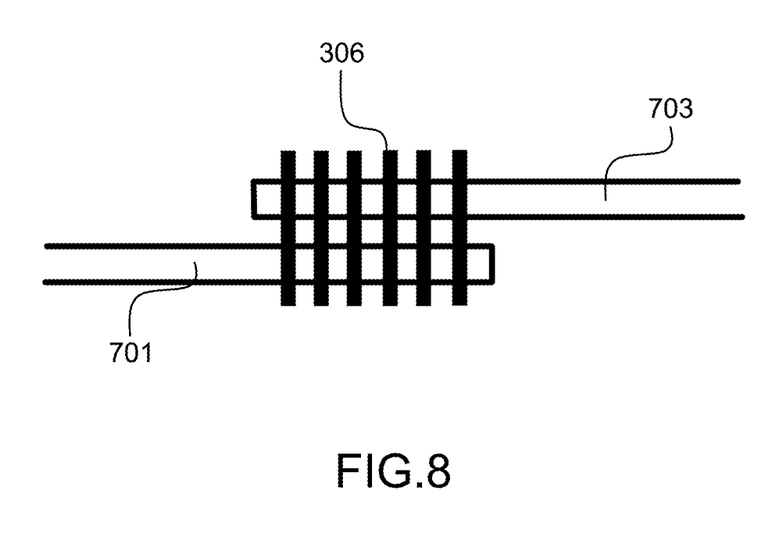
FIG. 8 is the structural view showing the side-band eliminator.
Figure 9:
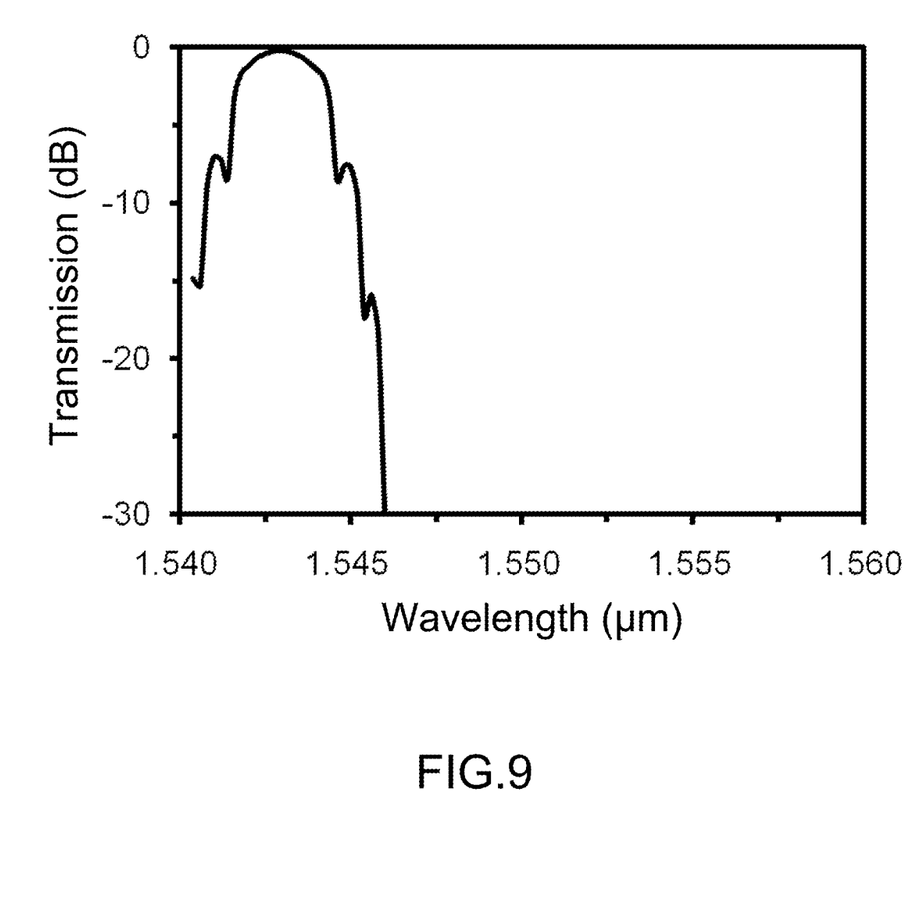
FIG. 9 is the view showing the ideal spectral band obtained from the side-band eliminator.

Please further refer to FIG. 8 and FIG. 9, which are a structural view showing a side-band eliminator; and a view showing an ideal spectral band obtained from the side-band eliminator. As shown in the figures, when an optical signal is reflected by the grating, the signal is inputted into the fifth input waveguide 701 for forming cross-state optical coupling with the fifteenth output waveguide 703. Thus, the optical signal is coupled to the fifteenth output waveguide 703. After the eighth grating 306 is deposed on the two parallel waveguides 701,703 for reflecting a side band, the side band is reflected to truncated positions of the waveguides 701,703 to be scattered.

Thus, the present disclosure uses an especially designed side-band eliminator to eliminate side bands for obtaining an ideal passband, where, after the interaction, the spectral band obtains a square-like distribution as an ideal spectral band, as shown in FIG. 9.

Furthermore, the first output waveguide 103 has not only an ideal spectral band but also two side bands. Thus, the first output waveguide 103 is connected with two novel eliminators, the first side-band eliminator 220 and the second sideband eliminator 222, for obtaining the ideal passband by eliminating the two side bands.

Figure 10:
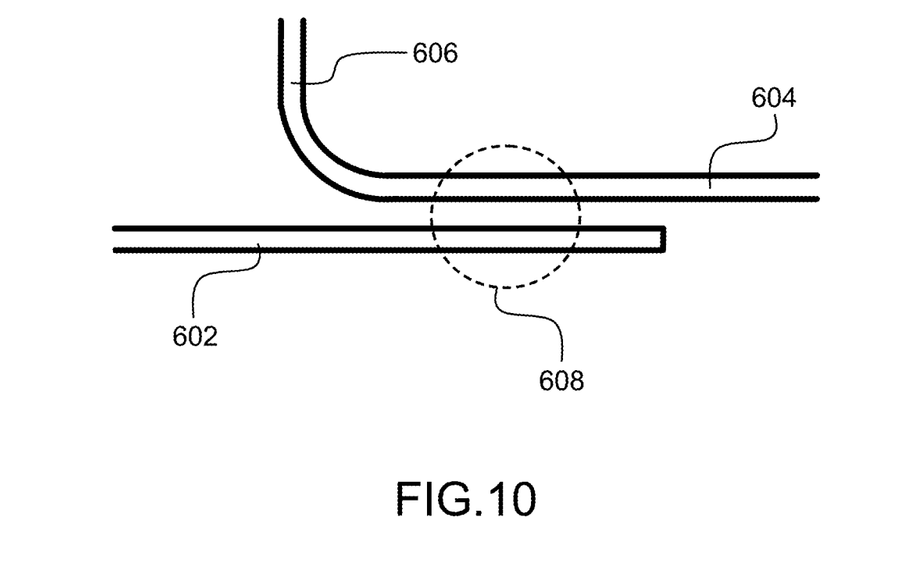
FIG. 10 is the structural view showing the cross-state directional coupler.

Please refer to FIG. 1 and FIG. 10, which are a structural view showing the preferred embodiment and a structural view showing a cross-state directional coupler. As shown in the figures, directional couplers used in the present disclosure is in a cross state. The cross-state directional couplers and gratings are combined to form grating-assisted cross-state directional couplers connected with a sixth output waveguide 117 and a seventh output waveguide 119.

Lights having different wavelengths enter from a fourth input waveguide 602 to be passed through a parallel coupling waveguide 608 for completely coupling the lights from the fourth input waveguide 602 into the thirteenth output waveguide 604.

By deposing the grating on the cross-state directional coupler to form the grating-assisted cross-state directional coupler, a lights having a specific wavelength is reflected to be coupled to the fourteenth output waveguide 606. The wavelength division mechanism used here is provided by the grating and the frequency response obtained is similar to what is provided by a general grating, where the spectral band has −5 dB crosstalk, as shown in FIG. 4.

The grating-assisted cross-state directional couplers used in the present disclosure are connected with a sixth output waveguide 117 and a seventh output waveguide 119 for spectral band interaction between asymmetric Mach-Zehnder interferometer and grating, where the spectral band has an ideal main square-like distribution with side bands of crosstalk though. Furthermore, lights having different wavelengths are separately coupled to a second output waveguide 105, a third output waveguide 107, a fourth output waveguide 109 and a fifth output waveguide 111. Because it still have many side bands to induce crosstalk, the present disclosure uses a third side-band eliminator 224 and a fourth side-band eliminator 226 to be connected with the second output waveguide 105 and the third output waveguide 107 to eliminate the side bands, respectively.

Hence, the present disclosure combines a grating-assisted asymmetric Mach-Zehnder interferometer 100; a plurality of grating-assisted cross-state directional couplers 206,208; a plurality of gratings deposed on the couplers 301,303,305; and a plurality of especially designed side-band eliminators 220,222,224,226 to obtain a single-stage 1×5 grating-assisted wavelength division multiplexer having 5 output ends—an eighth output waveguide 121, a ninth output waveguide 123, a tenth output waveguide 125, a fourth output waveguide 109 and a fifth output waveguide 111. Therefore, an ideal passband which is similar as Bragg Grating can be obtained by using side-band eliminators 220,222,224,226, which needs general grating within only.

Figure 11:
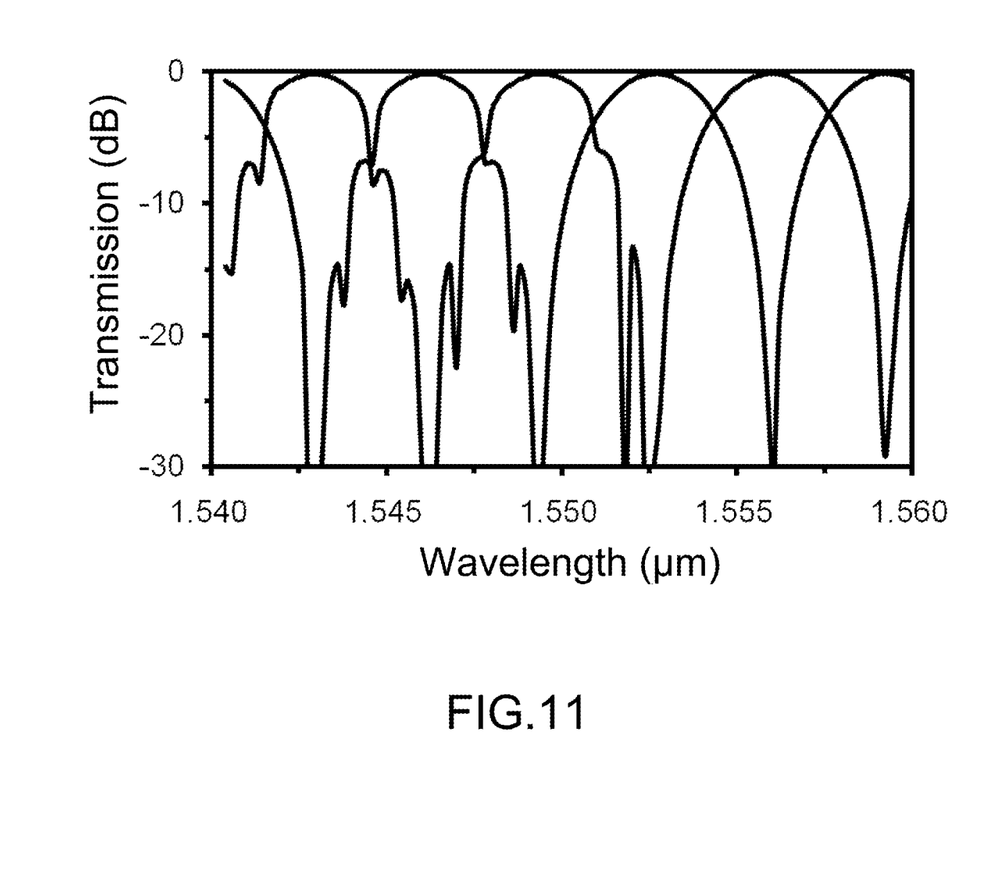
FIG. 11 is the view showing the spectrum of the preferred embodiment.

Please refer to FIG. 11, which is a view showing a spectrum of the preferred embodiment. As shown in the figure, the present disclosure has five output ends and a nearly ideal passband for spectral response. The present disclosure has a small size, an easy fabrication process and a high performance, which is a best ideal wavelength division multiplexer for IC-to-IC optical interconnection.

The present disclosure uses grating-assisted asymmetric Mach-Zehnder interferometer and grating-assisted cross-state directional coupler accompanied with especially designed side-band eliminators for 5-channel wavelength division multiplexing in a single stage by using general gratings, not Bragg gratings, for obtaining an ideal square-like band-pass filtering passband. Hence, the present disclosure has a small size and so is fit for IC-to-IC optical interconnection for greatly reducing the size of the biggest and most space-occupied wavelength division multiplexer. Furthermore, the present disclosure has still has simple fabrication process and good performance.

To sum up, the present disclosure is a single-stage 1×5 grating-assisted wavelength division multiplexer, where a single-stage 1×5 wavelength division multiplexer, which is a wavelength division multiplexer for multiplexing and demultiplexing of a single-chip optical transceiver, is provided for IC-to-IC optical interconnection with a small size, a simple fabrication process and good performance.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A single-stage 1×5 grating-assisted wavelength division multiplexer, comprising
a grating-assisted asymmetric Mach-Zehnder interferometer, said grating-assisted asymmetric Mach-Zehnder interferometer comprising
a first 3 dB directional coupler, said first 3 dB directional coupler being connected with an end of a first input waveguide to receive a light from said first input waveguide to divide said light into two lights having even powers;
an asymmetric phase-shifting waveguide region, an end of said asymmetric phase-shifting waveguide region being connected with said first 3 dB directional coupler, said asymmetric phase-shifting waveguide region having a first phase-shifting waveguide and a second phase-shifting waveguide, a parallel area of said asymmetric phase-shifting waveguide region being obtained by a part of said first phase-shifting waveguide and a part of said second phase-shifting waveguide, said part of said first phase-shifting waveguide being parallel to said part of said second phase-shifting waveguide with a fixed interval maintained, a phase difference being obtained from said parallel area of said asymmetric phase-shifting waveguide region after said two lights having even powers being passed through said first phase-shifting waveguide and said second phase-shifting waveguide separately;
a first grating, said first grating being obtained on said parallel area of said first phase-shifting waveguide and said second phase-shifting waveguide; and
a second 3 dB directional coupler, said second 3 dB directional coupler being connected with another end of said asymmetric phase-shifting waveguide region to receive said two lights having said phase difference from said asymmetric phase-shifting waveguide region, said two lights having said phase difference being interfered with each other to process wavelength division multiplexing to be coupled to a first output waveguide, a sixth output waveguide and a seventh output waveguide by different wavelengths separately;
a first grating-assisted cross-state directional coupler, said first grating-assisted cross-state directional coupler being connected with an end of said grating-assisted asymmetric Mach-Zehnder interferometer through said sixth output waveguide, said first grating-assisted cross-state directional coupler comprising said sixth output waveguide, an end of said sixth output waveguide being connected with said first phase-shifting waveguide;

a fourth output waveguide, a part of an end of said fourth output waveguide being parallel to a part of another end of said sixth output waveguide with a fixed interval maintained;

a second grating, said second grating being obtained on said fourth output waveguide and said sixth output waveguide; and a second output waveguide, an end of said second output waveguide being connected with an end of said fourth output waveguide;

a second grating-assisted cross-state directional coupler, said second grating-assisted cross-state directional coupler being connected with another end of said grating-assisted asymmetric Mach-Zehnder interferometer through said seventh output waveguide, said second grating-assisted cross-state directional coupler comprising said seventh output waveguide, an end of said seventh output waveguide being connected with an end of second phase-shifting waveguide;

a fifth output waveguide, a part of an end of said fifth output waveguide being parallel to a part of another end of said seventh output waveguide with a fixed interval maintained;

a third grating, said third grating being obtained on said fifth output waveguide and said seventh output waveguide; and a third output waveguide, an end of said third output waveguide being connected with an end of said fifth output waveguide;

a first side-band eliminator, an end of said first side-band eliminator being connected with another end of said grating-assisted asymmetric Mach-Zehnder interferometer through said first output waveguide, said first side-band eliminator comprising said first output waveguide, an end of said first output waveguide being connected with another end of said first phase-shifting waveguide;

a connecting waveguide, a part of an end of said connecting waveguide being parallel to a part of another end of said first output waveguide with a fixed interval maintained; and a fourth grating, said fourth grating being obtained on said first output waveguide and said connecting waveguide;

a second side-band eliminator, an end of said second side-band eliminator being connected with another end of said first side-band eliminator through said connecting waveguide, said second side-band eliminator comprising said connecting waveguide;

an eighth output waveguide, a part of an end of said eighth output waveguide being parallel to a part of another end of said connecting waveguide with a fixed interval maintained; and a fifth grating, said fifth grating being obtained on said eighth output waveguide and said connecting waveguide;

a third side-band eliminator, an end of said third side-band eliminator being connected with another end of said first grating-assisted cross-state directional coupler through said second output waveguide, said third side-band eliminator comprising said second output waveguide;

a ninth output waveguide, a part of an end of said ninth output waveguide being parallel to a part of another end of said second output waveguide with a fixed interval maintained; and a sixth grating, said sixth grating being obtained on said second output waveguide and said ninth output waveguide; and a fourth side-band eliminator, an end of said fourth side-band eliminator being connected with another end of said second grating-assisted cross-state directional coupler through said third output waveguide, said fourth side-band eliminator comprising said third output waveguide;

a tenth output waveguide, a part of an end of said tenth output waveguide being parallel to a part of another end of said third output waveguide with a fixed interval maintained; and a seventh grating, said seventh grating being obtained on said third output waveguide and said tenth output waveguide.

2. The multiplexer according to claim 1, wherein said first grating to said seventh grating are all general gratings.

3. The multiplexer according to claim 1, wherein said second phase-shifting waveguide has a length shorter than said first phase-shifting waveguide.

* * * * *